US007051090B2

(12) United States Patent  (10) Patent No.: US 7,051,090 B2
Chen  (45) Date of Patent: *May 23, 2006

(54) UNIFIED VOICE AND DATA NETWORKING HAVING DEMARCATION LINES

(75) Inventor: Abraham Y. Chen, Mountain View, CA (US)

(73) Assignee: Avinta Communications, Inc., Milpitas, CA (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/011,645

(22) Filed: Oct. 22, 2001

(65) Prior Publication Data

US 2002/0087689 A1  Jul. 4, 2002

Related U.S. Application Data

(63) Continuation-in-part of application No. 09/522,425, filed on Mar. 9, 2000, now Pat. No. 6,721,790.

(51) Int. Cl.
*G06F 15/177* (2006.01)

(52) U.S. Cl. ............... 709/220; 709/221; 709/222; 709/223; 709/240

(58) Field of Classification Search ........... 709/225, 709/220

See application file for complete search history.

(56) References Cited

U.S. PATENT DOCUMENTS

| 6,196,846 | B1 * | 3/2001 | Berger et al. ............... 434/118 |
| 6,445,682 | B1 * | 9/2002 | Weitz ........................ 370/257 |
| 6,721,790 | B1 * | 4/2004 | Chen ......................... 709/220 |
| 2002/0054598 | A1 * | 5/2002 | Lewis ................... 370/395.53 |

* cited by examiner

*Primary Examiner*—Zarni Maung
*Assistant Examiner*—Dhairya A. Patel

(57) ABSTRACT

A voice and data terminals networking system comprises a plurality of voice terminals capable of communicating with one another within an intercom system. Each voice terminal is designated with a unique first code and intercommunicated among an intercom system. The system includes a plurality of data terminals each is associated to a corresponding voice terminal and designated with a unique second code consisted by at least first and second numbers and is interconnected to a LAN system. A transition gateway selected from one of the voice and data terminals for interfacing between internal and external communications. The system further includes a device that is used for selecting the first and second codes of the voice and the associated data terminals; wherein the second number of the second code of the associated data terminal is selected by the means such that the second number of the second code is completely identical to the first code of the voice terminal. The system further provides full voice functions based on voice terminals, without the participation from the associated data terminals. The system further consists of a transition Gateway module which facilitates the flexibility of mix-and-match among WAN and LAN technologies.

14 Claims, 5 Drawing Sheets

Fig. 3

TCP/IP PROPERTIES OF DATA TERMINAL 120

| 301 IP ADDRESS | 305 192.168.0.155 |
|---|---|
| 302 SUBNET MASK | 306 255.255.255.0 |
| 303 GATEWAY | 307 192.168.0.234 |
| 304 DNS | 308 192.168.0.234 |

UNIFIED VOICE AND DATA NETWORKING HAVING DEMARCATION LINES

RELATED APPLICATION

The present invention is a Continuation-In-Part (CIP) of a application, Ser. No. 09/522,425, filed on Mar. 9, 2000 now U.S. Pat. No. 6,721,790 entitled USER SETTABLE UNIFIED WORKSTATION IDENTIFICATION SYSTEM.

BACKGROUND OF THE INVENTION

1. Technical Field

This invention relates to enhancement of on-premises networking equipment's addressing system.

2. Description of the Related Art

When multiple data processing equipment and/or computing devices are interconnected to form a Local Area Network (LAN), each has to have an unique Network Address so that information can be routed to the intended terminal. When a LAN is interconnected with others through Wide Area Network (WAN) such as Internet, each LAN has to be assigned with an Internet Protocol Address (IP Address) for similar purpose. Both of these systems have been using an uniform identification format of four decimal numbers each ranging from 0 to 255, separated by the symbol "." (period). Thus, this has been referred to as the "Dotted-Decimal" notation.

Each LAN would also designate one or more of its nodes as "Gateway" for the purpose of communicating with other LANs through the WAN. Consequently, the rest of terminals in the LAN have to be aware of the Gateway's Network Address within the LAN, so that traffic to other LANs can be funneled through the Gateway.

In addition, to distinguish and route WAN and LAN traffic among LANs and within a LAN, respectively, a SubNet Mask is used to segregate the IP Address information in messages. Although it functions based on binary algebra of utilizing "0" & "1" for screening, this Mask is also presented in the Dotted-Decimal notation.

Furthermore, certain terminal (or node) in a LAN or a WAN maintains a database that is capable of translating a terminal's IP Address to a alpha-numerical name, or vice versa. They are known as DNS (Domain Name Server). This is important because human users would prefer to specify terminals by names that have some meaning, not by the Dotted-Decimal IP Address that is concise for data processing equipment. A terminal without such facility, would need to be pre-stored with an IP Address that points to a DNS to function properly. Normally in a LAN, the DNS will be the Gateway, because it is the most logical candidate to possess such capability. Even if it does not have a database, it has the most direct access to a DNS in the WAN by virtue of the network architecture.

All combined, these four sets of Dotted-Decimal numbers, which are commonly referred to in the art as TCP/IP (Transmission Control Protocol/Internet Protocol) Properties, are very important parameters for the proper operation of data WANs and LANs. However, they are rather meaningless numbers for human users.

Traditionally, data WANs and LANs are set up and maintained by specially trained personnel with job titles such as Datacom Manager (other titles such as Network Manager or Network Administrator) who deal with the TCP/IP Properties daily. The IP Address of Internet nodes is coordinated by organizations such as Network Solutions <www.netsol.com>. The end users of the data equipment, however, have very little knowledge about these network parameters. To them, this is a somewhat mysterious subject.

A close analogy can be found in conventional voice communication. Telephone company has been assigning a Directory Number (DN—commonly known as the "telephone number") to each subscriber for routing telephone calls through Public Switched Telephone Network (PSTN). For business entities of significant size, additional local switching equipment such as Private Branch eXchange (PBX) or Private Automatic Branch eXchange (PABX), would be used. Each worker is assigned an Extension Number within the business so that telephone calls can be further routed to an individual's desk, directly.

PSTN service has always been offered by telephone operating companies with specially trained staff. Full time organizations under the supervision of FCC (Federal Communications Commission) administrate the nation-wide DNs. A business' PBX (or PABX) has traditionally been maintained by a Telecom Manager whose duties include assigning and maintaining a consistent set of Extension Numbers.

As the PBX and LAN technologies mature, the equipment itself has become affordable to small business and homes. Thus, SOHO (Small Office Home Office) has become the emerging market for these products. However, their installation and maintenance practices still require significant technical know-how.

One of them is the assignment and maintenance of the IP Address in a LAN and the Extension Number in a PBX. Unique identification codes need be assigned to all users for a LAN or a PBX to begin to function. If these numbers are not properly managed, operation of these systems can easily be disrupted.

This has been one of the major impedances for these products to enter the SOHO market. The potential customers can not afford a Datacom or Telecom manager. Yet, they are simply scared by the extensive efforts required to own such systems by larger business.

The Extension Number in a PBX is not as difficult a subject as the IP Address in a LAN, because the Extension Numbers are published in a business' directory and are being used in daily operation. It is relatively easy to correlate such a number to a co-worker's name. The IP address of a data processing equipment, on the other hand, is too remote to most people.

The advent of Distributed PABX (DPABX) (U.S. Pat. No. 5,596,631) and HomePNA (Home Phone Network Alliance) (U.S. Pat. No. 5,696,790), both being modular in device construction, peer-to-peer in network addressing and random physical wiring architecture, has made these products one step closer to the consumer market where more capable and efficient communication, both voice and data, is in fast growing demand.

Both of these products consist of identical modules at each location where service is desired. The modules are interconnected via a single pair of traditional telephone wires. There is no central or master unit in the system. The modules address one another based on an identification code assigned to each. These basic characteristics allow a SOHO owner to add, move or disconnect a module easily. Furthermore, a failed module with a critical application can be quickly replaced by another one of lesser importance, minimizing the disruption to business. Thus, the need for Telecom or Datacom Manager could be avoided.

The DPABX control modules are designed with "subscriber settable ID switches" which allow an user to assign an Extension Number to a control module by simply changing the ID switches to a new combination. The validity of the chosen Extension Number can be verified easily by making an intercom call to this number. For example, if this latest choice is a duplication of an existing assignment, the other telephone extension in the network would be alerted by this test call. A different number combination should then be selected for this last control module. The verification process is repeated until an available Extension Number is identified. Equipped with this simple procedure, this system is fully ready for consumer market.

The HomePNA Adapters, on the other hand, are still evolving from its data LAN origin. Among other parameters that may affect their operation, the setting of "IP Address" is still a nontrivial task reserved for the experienced.

One approach of attempting to ease this difficulty has been practiced in the LAN technology for some time. It is termed DHCP (Dynamic Host Configuration Protocol). It enables the Gateway of a LAN to automatically assign a set of values to a Client as its IP Address. This relieves the burden on the Datacom Manager who has to oversee the operation of the LAN. Because the DHCP process is somewhat random, however, the IP Address assigned by the Gateway becomes even less predictable. It makes troubleshooting more difficult. For example, when a new terminal is installed onto a LAN, it could receive an IP Address assignment that has already been used by another terminal which happened to be not active. Conflict arises in the future when both of these terminals are powered on at the same time. To avoid this unpredictable situation, some Network Managers would rather keep DHCP feature disabled.

Nevertheless, it is interesting to note that among the four sets of Dotted-Decimal parameters that each data processing equipment in a LAN has to have, only the fourth number of a terminal's own "IP Address" is a variable necessary for uniquely identifying it.

All of the other numbers are either a fixed template (first three numbers in the "IP Address" and the full "SubNet Mask") of the type of LAN that the terminal belongs to, or the "IP Address" of the "Gateway" and the "DNS" in the same LAN, which are pre-defined because such nodes have to be set up first. So, the task of identifying a data processing equipment can be reduced to the selection of a number between 0 and 255 that is unique within the same LAN. This narrowed scope of task would make the setting of TCP/IP Properties manageable.

SUMMARY OF THE INVENTION

It is therefore the object of the present invention to achieve the combined goals of providing a simplified method of specifying a data communication terminal's identity, unifying the address of a workstation consisting of multiple communication capabilities, and easing the tasks of managing a system with multiple nodes of workstations or terminals.

Another object of this invention is to partition a LAN in such a way that the subsystem modules are configured with systematic functional divisions for more efficient overall operation, as well as offering configuration flexibilities for different services.

Yet another object of this invention is to provide a partition for both analog narrowband and digital broadband signals between WAN and LAN such that responsibilities between WAN service provider and LAN owner are clearly isolated.

In order to achieve the objectives set forth, a method for arranging voice and data transmission within voice and data terminals of a LAN and WAN system in accordance with the present invention comprises the steps of 1) providing a plurality of voice terminals capable of communicating with one another within an intercom system, 2) providing a plurality of data terminals each being associated to a corresponding voice terminal and interconnected to a LAN system; and 3) assigning a voice signal within the voice terminal with higher transmission priority than a data signal within the data terminal.

In addition, a WAN to LAN Gateway is configured to allow full bandwidth transmission of WAN signals to every voice and data terminal.

According to one aspect of the present invention, wherein the data signal is temporarily buffered when voice signal with higher priority is transmitting The features of the present invention will be more readily understood upon a thoughtful deliberation of the following detailed description of a preferred embodiment of the present invention with reference to the accompanying drawings.

BRIEF DESCRIPTION OF THE DRAWINGS

FIG. 3 is an example of TCP/IP Properties that a data terminal may possess.

DESCRIPTION OF THE PREFERRED EMBODIMENT

Figure 1:
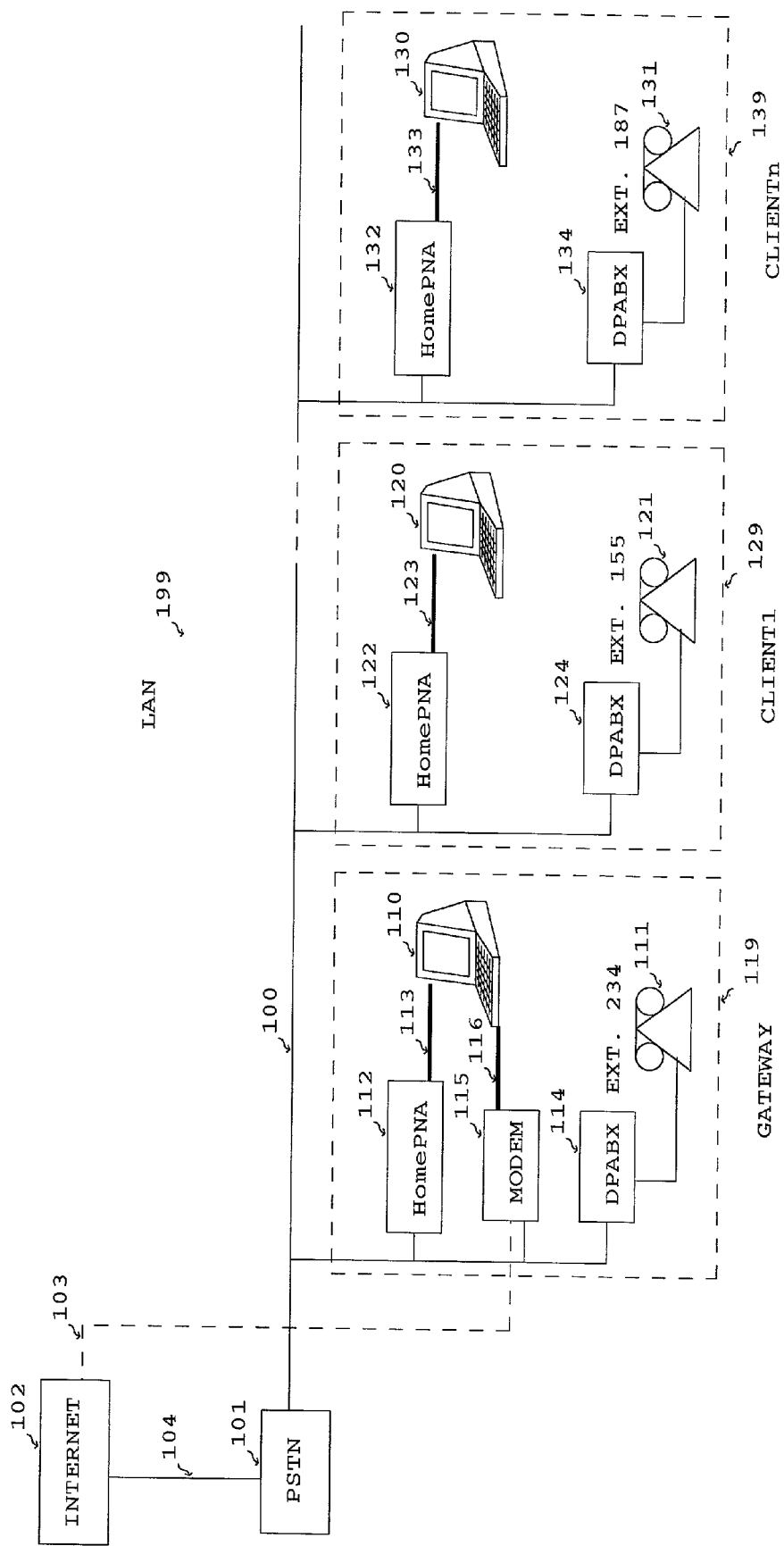
FIG. 1 presents the basic environment that the current invention is applicable.

FIG. 1 depicts the basic architecture of several workstations in a SOHO environment networked through a telephone line 100 which is extended from PSTN 101. As a well known practice in the art, telephone line 100 could be branched, tapped or extended to reach all of the devices at each workstation as long as the electrical connectivity is maintained.

The workstations consist mainly of, by way of representation, Data Processing Equipment 110, 120, . . . 130 and Telephone Station Instruments 111, 121, . . . 131, respectively.

The Data Processing Equipment 110, 120, . . . 130 are connected to the telephone line 100, via data links 113, 123, . . . 133 and by means of HomePNA Adapters 112, 122, . . . 132, respectively, to form a LAN 199 for data communication. HomePNA Adapters 112, 122, . . . 132 are commercial implementation of U.S. Pat. No. 5,696,790. The data links 113, 123, . . . 133 are one of the standard cable connections, such as USB (Universal Serial Bus), commonly used with Personal Computer (PC) products. Thus, they are not detailed here.

The Telephone Station Instruments 111, 121, . . . 131 are connected to telephone line 100 via DPABX Controllers 114, 124, . . . 134, respectively, to form a DPABX network for voice communication. DPABX Controllers 114, 124, . . . 134 are commercial implementation of U.S. Pat. No. 5,596, 631. Thus, they are not detailed here.

Figure 5:
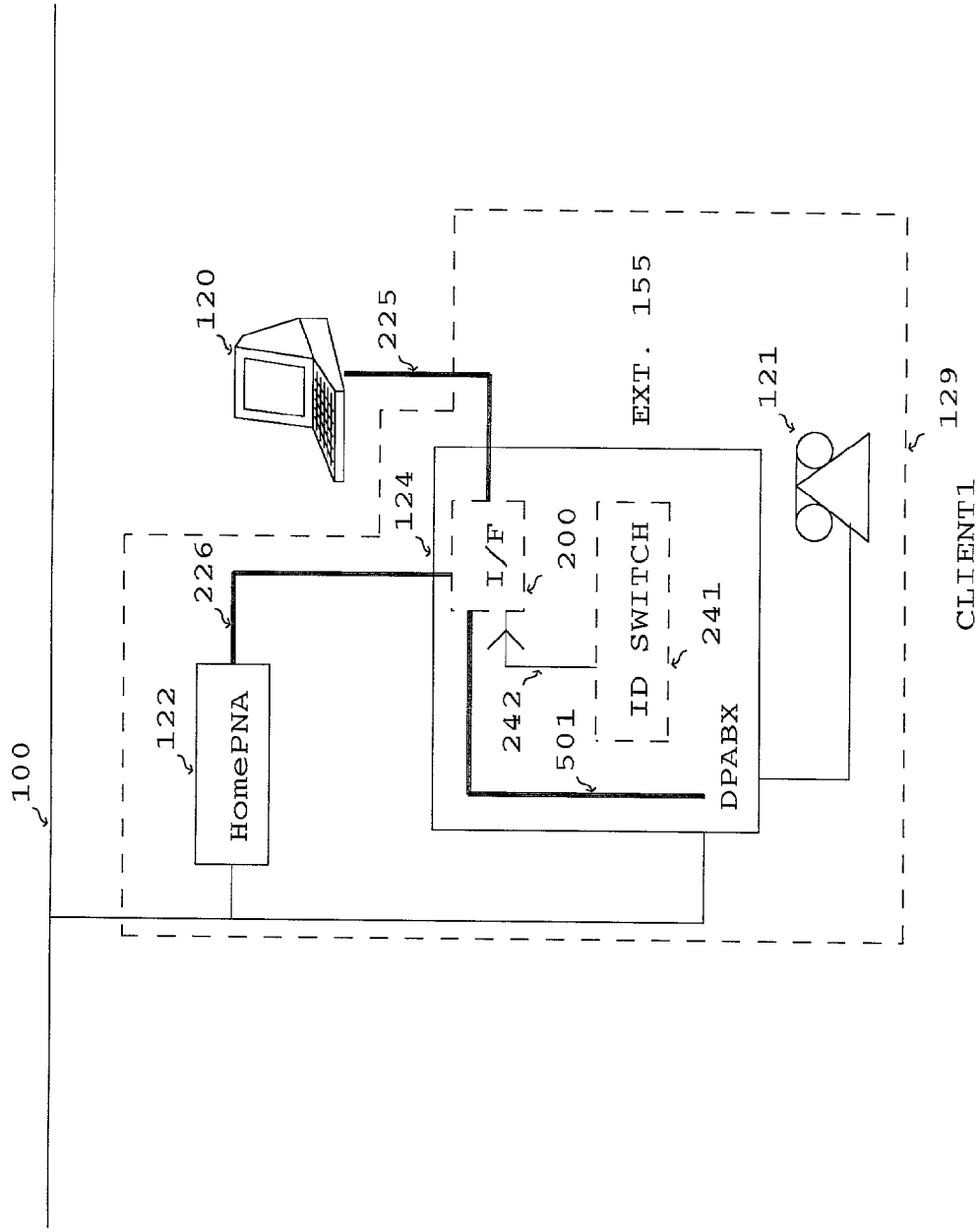
FIG. 5 is a more detailed diagram of FIG. 2 for the purpose of disclosing the operational relationship between the Telephone Station Instrument 121 and the Data Processing Equipment 120 by the addition of a signal line 501.

For the voice network to function properly, each of the DPABX Controllers 114, 124, . . . 134 is given an unique Extension Number by setting the "ID Switches" (Box 241 of FIG. 5 in U.S. Pat. No. 5,596,631). As in any PABX, the Extension Numbers could be any convenient length, provided that they are uniform throughout the system and each is only assigned to one application. This convention is known in the art as "numbering plan". For the purpose of matching with the convention (numbers from 0 to 255) in identifying Data Processing Equipment 110, 120, . . . 130, while avoiding the leading "0", DPABX Controllers 114, 124, . . . 134 are arbitrarily given Extension Numbers 234, 155, . . . 187 for the following discussion.

Data Processing Equipment 110 is also equipped with a data modem 115 for communication to the other data equipment in Internet 102. The data traffic from Internet 102 on telephone line 100 can be transmitted through data link 116 to Data Processing Equipment 110. Where it can go on through data link 113, HomePNA Adapter 112 to reach telephone line 100 again, but at a different frequency, ready to be distributed to other Data Processing Equipment 120, . . . 130 via HomePNA Adapters 122, . . . 132, respectively. Thus, Data Processing Equipment 110 and associated device cluster is referred to as the "Gateway" for LAN 199. Devices associated with Data Processing Equipment 120, . . . 130 are referred to as CLIENT1, . . . CLIENTn, respectively. This technology, generally referred to as "Internet sharing", is well known in the art. Thus, the details are not discussed here.

There are several variations in implementing modem 115:

A. As shown in FIG. 1, modem 115 is basically an analog modem, such as V.90 with transmission speed up to 56 Kbps. And, the data link 116 would be a standard serial (RS232) cable. This is commonly referred to as an external analog modem to a PC which utilizes telephone line 100 through PSTN 101 to access Internet 102 via data link 104.

B. Modem 115 could be a DSL (Digital Subscriber Line) modem, which also operates on standard telephone line 100. However, to support higher data throughput available from DSL, the data link 116 would be an Ethernet type of cable.

C. Modem 115 may be constructed with one of several other technologies, such as coaxial cable, radio, fiber optics or satellite. If one of these is utilized, the connection between the modem 115 and the Internet 102 would no longer rely on the telephone line 100. The dotted line 103 depicts such data paths. For these cases, much higher data transmission speed is possible. The data link 116 is most likely an Ethernet cable or equivalent.

Note that all of these variations in Gateway's Internet access facility do not affect the workstation identification subject of the current invention. They are presented here for the completeness of the networking system overview.

Since HomePNA Adapters 112, 122, . . . 132 could be physically built inside of Data Processing Equipment 110, 120, . . . 130, respectively, a more general terminology "Data Terminal" will be used to refer to such combinations. In addition, Modem 115 could be built inside of Data Processing Equipment 110. Thus, when the term "Gateway" is used, it would also include Modem 115.

Similarly, Telephone Station Instruments 111, 121, . . . 131 could be constructed with DPABX Control Modules 114, 124, . . . 134 inside, respectively. For simplicity in reference in the following discussion, the terminology "Voice terminal" will be used to mean such combinations.

In addition, dotted-lined rectangular boxes, 119, 129, . . . 139, each encompasses one Data Terminal and one Voice Terminal form workstations GATEWAY, CLIENT1, . . . CLIENTn, respectively.

Figure 2:
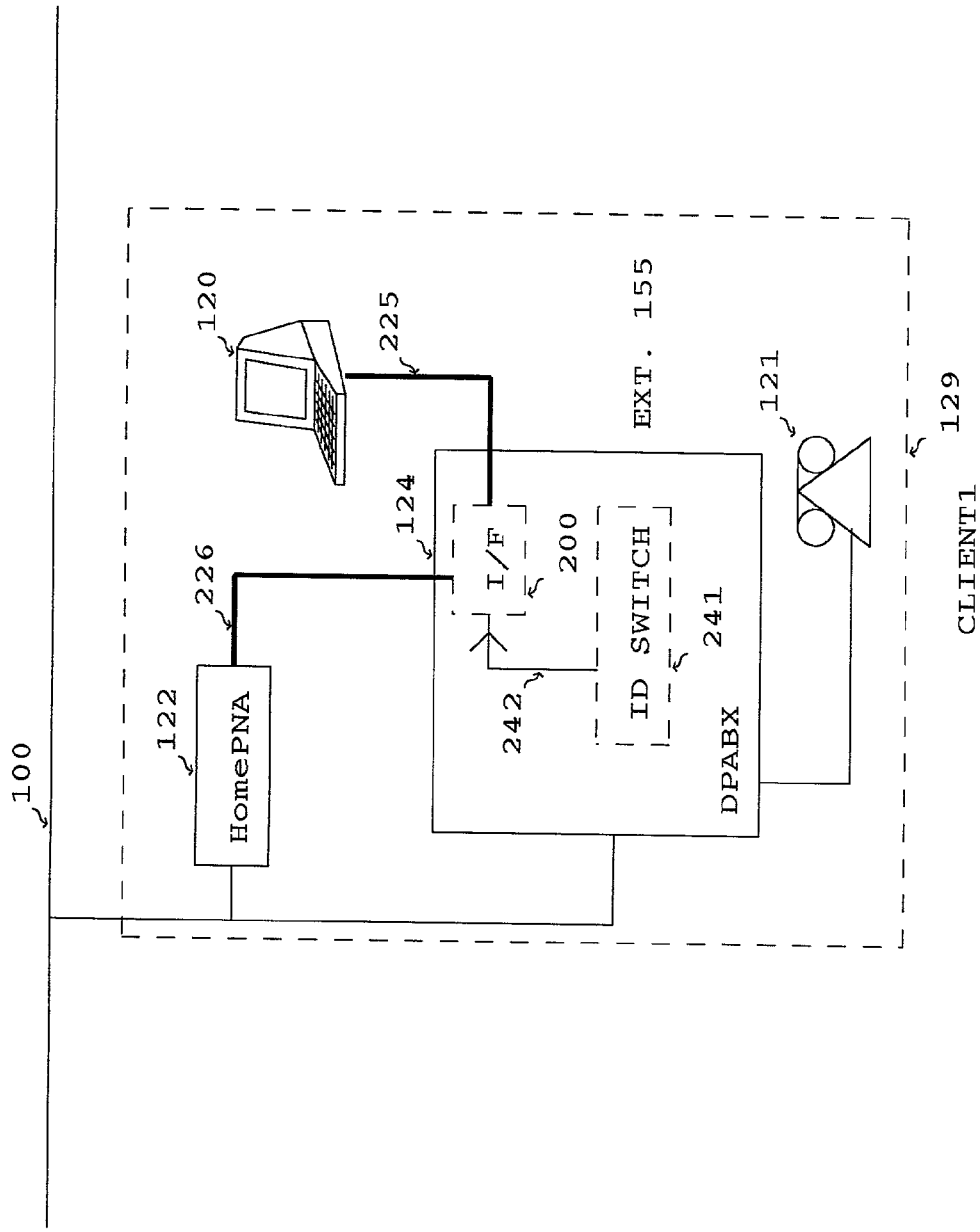
FIG. 2 is a block diagram of the current invention.

FIG. 2 presents a block diagram of the current invention which is accomplished by modifying the subsystem interconnections of a workstation. By way of example, FIG. 2 is a duplicate of CLIENT1 129 in FIG. 1, except that;

A. DPABX Controller 124 is partially "exploded" to show within it, the "ID Switch" 241 and its output data line 242 disclosed by U.S. Pat. No. 5,596,631.

B. An InterFace (I/F) circuit block 200 has been added to the construction of DPABX Controller 124 to make use of the information on signal line 242 from ID Switch 241.

C. Data link 123 has been replaced by two new data links. Data link 225 goes between Data Processing Equipment 120 and I/F 200. Data link 226 connects I/F 200 with HomePNA Adapter 122. Both of these two new data links are the same type of original cabling, such as USB shown in FIG. 1. Thus, there is no change needed in HomePNA Adapter 122. Similarly, Data Processing Equipment 120 does not need to make any hardware change, either. Except, additional software will be implemented in the Data Processing Equipment 120 to take advantage of the information available through I/F 200.

This arrangement provides Data Terminal 120 the means to read the current value "155" of ID Switch 241. While the combination of data links 225 and 226 through I/F 200 maintains the same functions that the original data link 123 provides.

It would be apparent that with this provision, the only part of the IP Address that is required to uniquely identify Data Terminal 120 can always be the same as the Extension Number used in the Voice Terminal of the DPABX system. Since the Extension Number is user settable and verifiable as disclosed in U.S. Pat. No. 5,596,631, the IP Address of Data Terminal 120 would possess the same characteristics of user-friendliness.

FIG. 3 lists the parameters of Data Terminal 120 as an example for TCP/IP Properties. The following details how would such information be defined for each workstation in FIG. 1:

A. The first three numbers (192.168.0) in IP Address 301, Gateway 303 and DNS 304 are standard prefixes or templates for LANs.

B. The last group of digits "155" 305 for IP Address 301 is obtained from the ID Switches 241 as discussed in FIG. 2.

C. Since decimal "255" is equivalent to "11111111" (eight 1's ) in binary numbering system, applying the Subnet Mask 302 with a pattern of "255.255.255.0" 306 through a logic "OR" operation to an IP Address 301 with the value of "192.168.0.155" 305 will "max out" the first three groups of values and leave the fourth unchanged. The only meaningful number in the resulting "255.255.255.155" would be "155" which is unique to CLIENT1 129. This is the same number as Extension "155" in DPABX for the voice networking. Thus, an unified address identification system for a workstation consisting of both Voice and Data Terminals is realized.

D. The values of Gateway Address 307 and DNS Address 308 are both pointing to Gateway 119 with workstation identification "234", as specified by the value of the fourth group of digits. The "234" in Gateway IP Address 307, is preset by implementing the same subsystem interconnect arrangement in the Gateway 119.

During operation of the proposed workstations, the value defined by ID Switch 241 can be read by local Data Terminal 120 to set its own IP Address 301. This can be done at various opportunities:

A. Initial installation of a networking software to a data processing equipment.

B. Upon each restart or power-on of a data processing equipment and,

C. Prior to initiating an active communication session.

Since a workstation's identification in a LAN should be unique, simple software can be installed in all Data Terminals to scan for conflicts with IP Addresses that are already active in the LAN. When duplication is detected, the Data Terminal shall terminate the attempt to connect to the LAN, and sets off a local alarm for the user to resolve the conflict. Because the IP Address 301 is controlled by the ID Switch 241 of the Voice Terminal, a quick review of the company telephone directory or an intercom test call would clarify the situation. A corrective measure of setting the ID Switch 241 to an unused combination would allow the Data Terminal to proceed with its LAN log-on process.

Figure 4:
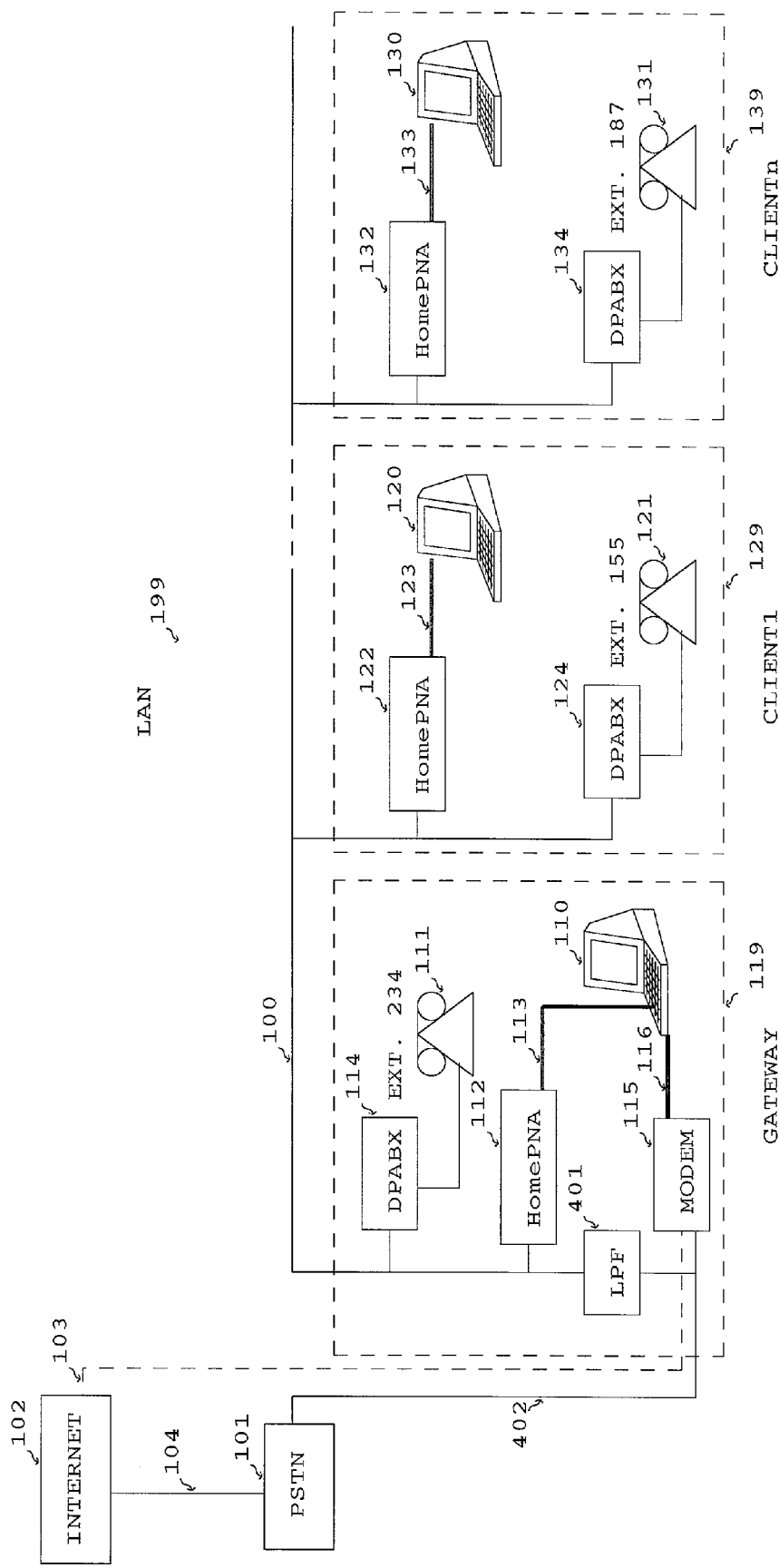
FIG. 4 is a duplication of FIG. 1 for most the parts except that the relative positions of the subsystems inside of Gateway 119 have been re-arranged to allow the addition of a LPF (Low Pass Filter) 401.

FIG. 4 outlines a more detailed subsystem arrangement of Gateway 119. The connection of telephone line 100 to PSTN 101 at Gateway 119 has been moved to the lower left corner of Gateway 119. The section of line 100 that connects between PSTN 101 and Gateway 119 has been given a separate designation, 402. As a result, all signals between PSTN 101 and the remaining Line 100 inside of LAN 199, have to flow through Gateway 119. And, the connection inside of Gateway 119 becomes part of line 100, instead of being previously a side branch to Line 100. Next, the DPABX 114 and the associated Telephone Station Instrument 111 have been relocated upward along telephone line 100. Then, a Low Pass Filter (LPF) 401 is inserted along the telephone line 100 between Modem 115 and HomePNA 112.

The function of the LPF 401 is to allow the traditional analog telephone service signals in the voice band (0–4.5 KHz) to pass through unimpededed, while blocking the higher frequency signals that are being transmitted in the LAN 199 as well as those between Gateway 119 and PSTN 101. LPF 401 is a well known building block for electronic circuits. Therefore, its details are not discussed herein.

The HomePNA networking signals transmitted among Gateway 119, CLIENT1 129, ... Client 139 along line 100 utilizes a frequency band roughly from 5.5 MHz to 9.5 MHz. On the other hand, broadband signals transmitted along telephone line 402 between PSTN 101 and Gateway 119 such as xDSL (Digital Subscriber Line, "x" stands for many possible variations of DSL formats) occupy frequency spectrum approximately from 25 KHz to 4.5 MHz.

HomePNA and xDSL signals are respectively optimized for the specific environments that they are intended for. That is, HomePNA is for short distance on-premises wiring characterized by random branches and taps. xDSL is designed for subscriber loops characterized by point to point wiring for long distance transmission. It is therefore desirable to block them from reaching the other's domain to avoid effects of unfavorable environment, and interferences between the two, both may lead to performance degradations.

There is also an operational benefit of being able to segregate the signals by Gateway 119, such as easily isolating responsibilities of the respective equipment providers to expedite the trouble diagnostics and repairs. With LPF 401 inserted between lines 100 and 402 as shown, the voice band signal from traditional analog telephone services is passed through unaffected. The HomePNA signal is restricted on line 100 and the xDSL signal remains on line 402. Consequently, Gateway 119 provides a demarcation function between WAN services through PSTN 101 and LAN 199 functions by Clients 129 . . . 139. That is, the integrity of each signal can be easily verified, independently.

FIG. 5 differs from FIG. 2 with an extra signal line 501 added, and the dotted line encircling CLIENT1 129 has been "rerouted" to limit it to a fewer subsystems. The main effect of this is that the Data Processing Equipment 120 and its signal line 225 become external to CLIENT1 129.

The added signal line 501 provides a link between DPABX main circuitry to HomePNA signals via I/F 200. This detailed configuration depicts that CLIENT1 129 is therefore capable to function as voice communication terminal utilizing both analog telephony directly on copper wire pair line 100 utilizing the DPABX technology, as well as digital broadband facility via HomePNA adapter 122. With these functionalities established, CLIENT1 129 demonstrates that it is already a data terminal on HomePNA network without Data Processing Equipment 120. This configuration suggests that both analog and digital networking can be achieved and verified via voice communication services which is much more natural and therefore flexible for human beings to manage, than through computer terminals such as Data processing Equipment 120. Afterwards, the connection of Data Processing Equipment 120 through line 225 would be simply an add-on process and the data networking functions are fully provided by Client 129 with narrowed definition. For Data Processing Equipment 120 to join the networking, it need only be plugged into Client 129 utilizing signal line 225.

Many variations of my invention are possible. For example, instead of using physical switches to set the Extension Numbers for Voice Terminal, it is possible to use the dial keypad on the telephone station instrument for specifying these numbers. The stored numbers could be confirmed by visual displays such as LCD (Liquid Crystal Display) or synthesized voice that may be equipped in the station instrument.

For simplicity in presenting this invention, 3 digit numbers within the range from 100 to 255, inclusive, are used in the Figures. These give a set of 156 possible choices. For a smaller system, 2-digit number set ranging from 10 to 99, inclusive, can be used giving a choice of 90 combinations. For user convenience in a very small deployment, such as single family residences, single digit identification system with 9 choices (numbers among 1–9, inclusive) could be utilized. In all of these cases, address "0" is reserved for "Operator".

For larger business, 4 or 5 digit extension numbers may be in use. Some of them start with the same first couple of digits. So, it is not necessary to incorporate such digits in the IP Address. On the other hand, there is enough capacity in the IP Address notation to take care of this. That is, the third group of digits ("0" in the example) in IP Address can be used to expand its capability to encompass the extension numbers in a larger DPABX system. The handling of this expanded numbering system would be a very similar manner as disclosed.

For clarity, my invention has been presented with separate Data Processing Equipment, HomePNA Adapter, DPABX Controller, Telephone Station Instrument, modem, etc. for each workstation. Since all of the communication modules of one workstation are connected to the same telephone line, it would be natural to have all of the modules built into one common enclosure with only one single connection remaining to be plugged into Telephone Line 100. The identities of separate modules will no longer be visible externally, and the respective functions may be re-assigned to different subsystems for implementation efficiency and economy. For example, the unified address could even be specified through the data processing equipment's keyboard, and confirmed through its display screen. It should be noted, however, the spirit of my invention would still apply.

Analog voice networking through DPABX telephone system and digital data networking via HomePNA are utilized in presenting my invention. They may appear to be two disjointed technologies for different types of communications. Due to the fast advance of digital technology, it has begun to carry voice telephony traffic. As a matter of the fact, video signals can be carried through digital system as well. Thus, more choices of communication modes, such as VoIP (Voice over Internet Protocol), VoDSL (Voice over Digital Subscriber Line) etc., are available to an user. For example, additional digital technology based telephony channels could be accessed through a workstation with a configuration disclosed here. However, natural communication among humans is via analog voice. So, by virtue of its simplicity in man-machine interface, DPABX would continue to serve as the foundation in building up and maintaining such a multi-facet communication system.

My invention has been presented based on traditional telephone line as the LAN and DPABX transmission medium. It should be noted that my technique is not restricted to any particular transmission technology. The key essence is the setting of a terminal equipment's identification with a human-friendly method. The concept is equally applicable to other networks, be it based on power line, coax cable, fiber optics, radio or satellite. The method of applying unified terminal identification to all devices at the same physical location is independent of multiple transmission media in network.

In the disclosed LAN, workstations without the need for DPABX capability could be deployed with "degenerate or subset" version of the recommended IP Address, as long as the ID Switch 241 facility is incorporated. That is, the IP Address used could be outside of the range of the numbering plan defined for the DPABX. For example, for the LAN shown in the Figures, all numbers from 1 to 99 inclusive, are available for this purpose, because the DPABX operates with a 3-digit numbering plan.

This subset of numbers can be applied to service devices, such as a printer or an appliance whose identification codes are most likely not to change after setup. Of course, the choice of this kind of IP Address number has to be handled with careful control and documentation to avoid conflicts, very much like the traditional procedures that a Datacom Manager has to follow.

FIG. 4 upgrades the traditional demarcation line that was defined for analog telephone service to be applicable to digital broadband service as well. This is because all services on line 402 are available on line 100 while no intended signals appear on the other line. Applying to other available WAN and LAN transmission technologies, this configuration provides the flexibility for consumer to mix-and-match preferred technologies.

FIG. 5 also establishes a new service demarcation line that divides voice and data equipment within a LAN. That is, since Data Processing Equipment 120 is an add-on device to Client 129 after Client 129 has already established its networking in both analog and digital facilities via voice service, signal line 225 represents a demarcation line between a voice based networking and its add-on data applications. This is an important subject, because the more complicated Data Processing Equipment 120 could easily be removed from the network by disconnecting the interface line 225, whenever there is any operation abnormality with data applications. Yet, the integrity of the voice services provided by Client 129 can be maintained independently.

The architecture of a LAN terminal disclosed above resolves another common difficulty in a data-centric networking system. That is, with voice as the basic communication service and its associated device as the network access equipment, it becomes straightforward to control the flow of the traffic into the network. In particular, voice which is intolerant to transmission delays, can be transmitted as priority signal by simple control function built inside of each CLIENT1, 129 of FIG. 5. Data traffic from Data Processing Equipment 120 would be buffered by temporary storage capability that can be built inside of I/F 200. As all broadband networking systems are built with the high throughput of data applications in mind, such bandwidths are significantly wider than the total voice traffic conceivable in the same network. Therefore, congestion is totally avoidable, if the operation rules giving to CLIENT1 129 is to throttle back data traffic whenever traffic on LAN is getting congested, to guarantee smooth voice transmission. This operation protocol would eliminate the key issues of QoS (Quality of Service) in utilizing digital transmission for voice applications.

By extending this principle to other potential applications of this network, a priority list of all known categories of services can be predetermined. For example, Security Alarm should have the highest priority than Voice. Video signals should be between Voice and Data. Below Data, we can have Appliance Telemetry and Command applications. Lastly, Utility Meter Management, with low data rate, infrequent usage and time non-critical functions can be at the lowest priority list.

Similarly, with Data Terminal as add-on device behind Voice Terminal, the diversified data processing equipment that consumer may use at each location and change frequently becomes a non-issue for networking.

LPF 401 in FIG. 4 is an unique element necessary for the example utilized to disclose this invention because all signals are being transmitted over the same physical medium, copper wire pair, at different frequencies. In other WAN to LAN transitions, the media used for WAN and LAN are mostly different. Therefore, the isolation that LPF 401 provides can be implicitly accomplished.

This invention has been described with particular attention to its preferred embodiment. It should be understood that variations and modifications within the spirit and scope of the invention may occur to those skilled in the art to which the invention pertains.

I claim:

1. A method for selecting a unified identification code applied to voice and data terminals of a LAN and WAN system, comprising the steps of:
   1) providing a plurality of voice terminals capable of communicating with one another within an intercom system, each said voice terminal being designated with a first code consisted by a first number;
   2) providing a plurality of data terminals each being associated to a corresponding said voice terminal and interconnected to said LAN system, each said data terminal being designated with a second code consisted by at least second and third numbers; and
   3) providing a transition gateway interfacing between internal and external communications;

wherein said third number of said second code of said associated data terminal is selected such that said third number is completely identical to said first number of said first code of said voice terminal.

2. A method as recited in claim 1, wherein said transition gateway is selected from said voice and data terminals with additional functional subsystems.

3. A method as recited in claim 1, wherein said transition gateway provides not only signal format and protocol interfaces but also isolation between said LAN and said WAN by establishing a demarcation line between said LAN and said WAN allowing a clear segregation of responsibilities for diagnostics and services.

4. A method as recited in claim 1, wherein said transition gateway includes a signal segregation arrangement between signals transmitted on said WAN and said LAN.

5. A method as recited in claim 1, wherein a workstation configuration by said voice and data terminals is self-sufficient in providing voice communication with other said voice and data terminals in both analog narrowband and digital broadband formats.

6. A method as recited in claim 5, wherein said method provides digital data communication in a manner such that said data terminal's interface with said LAN is controlled and managed by said voice terminal.

7. A system as recited in claim 6, said data terminals may be substituted by another for identifying whether any one of said data terminals is not fully functional, thus establishing a demarcation line between said voice terminal and said data terminal.

8. A system as recited in claim 5, each said workstation may be substituted by another for identifying whether any one of said workstations is not fully functional, thus establishing a demarcation line between said LAN and said workstations.

9. A method as recited in claim 1, wherein each said voice terminal's transmission assumes higher priority than associated said data terminal's transmission which is temporarily buffered when said voice terminal is transmitting, or traffic on said LAN is becoming congested.

10. A voice and data terminals networking system, comprising:
a plurality of voice terminals capable of communicating with one another within an intercom system, each said voice terminal being designated with a unique first code, said voice terminal being intercommunicated among an intercom system;
a plurality of data terminals each being associated to a corresponding said voice terminal and designated with a unique second code consisted by at least first and second numbers, each said data terminal being interconnected to a LAN system;
a transition gateway selected from said voice and data terminals for interfacing between internal and external communications; and
means for selecting said first and second codes of said voice and said associated data terminals;
wherein said second number of said second code of said associated data terminal is selected by said means such that said second number of said second code is completely identical to said first code of said voice terminal.

11. A voice and data terminals networking system, comprising:
a plurality of voice terminals capable of communicating with one another within an intercom system, each said voice terminal being designated with a unique first code, said voice terminals being intercommunicated among an intercom system;
a plurality of data terminals each being associated to a corresponding said voice terminal and designated with a unique second code consisted by at least first and second numbers, said data terminals being interconnected to a LAN system;
a transition gateway selected from said voice and data terminals for interfacing between internal and external communications;
means for selecting said first and second codes of said voice and said associated data terminals; and
wherein said second number of said second code is selected by said means such that said second number of said second code is a portion of said first code.

12. A method for verifying IP address in a LAN, comprising the step of:
1) providing a plurality of voice terminals capable of communicating with one another within an intercom system, each said voice terminal being designated with a first code consisted by a first number;
2) providing a plurality of data terminals each being interconnected to a LAN system, each said data terminal being associated to a corresponding said voice terminal and designated with an IP address consisted by at least second and third numbers;
3) providing a transition gateway for interfacing between internal and external communications; and
4) selecting said third number of said IP address of associated said data terminal such that said third number is derived from said first number of said first code of said voice terminal; and
5) dialing said first number of said first code among said voice terminals of said intercom system to verify that said first number is not repeated thereby verifying said IP address is not repeated within said LAN system.

13. A voice and data terminals networking system, comprising:
a plurality of voice terminals capable of communicating with one another within an intercom system, each said voice terminal being designated with a unique first code, said voice terminal being intercommunicated within an intercom system;
a plurality of data terminals each being associated to a corresponding said voice terminal and designated with a IP address consisted of a second code with at least first and second numbers, each said data terminal being interconnected to a LAN system;
a transition gateway for interfacing between internal and external communications; and
means for selecting said second number of said second code of said associated data terminal from said first code of said voice terminal; and
means for verifying said first code to ensure said first code is not repeated thereby verifying said IP address is not repeated.

14. A method for arranging voice and data transmissions among voice and data terminals of a LAN and WAN system, comprising the steps of:
1) providing a plurality of voice terminals capable of communicating with one another within an intercom system;
2) providing a plurality of data terminals each being associated to a corresponding said voice terminal and interconnected to a LAN system; and 3) selecting among said data terminals a transition gateway for interfacing between internal and external communications;
4) setting voice as basic communication having higher transmission priority such that said data transmission may be temporarily buffered when said voice transmission from associated said voice terminal is commenced; and wherein each said voice terminal being designated with a first code consisted by a first number, and each said data terminal being designated with a second code consisted of at least second and third numbers, wherein said third number of said second code of said associated data terminal is selected such that said third number is completely identical to said first number of said first code of said voice terminal;

5) providing each said voice terminal with higher transmission priority than associated said data terminal's transmission.

* * * * *